United States Patent [19]
Bohrer

[11] Patent Number: 5,605,085
[45] Date of Patent: Feb. 25, 1997

[54] CIRCLE CUTTING DEVICE

[75] Inventor: Stephen P. Bohrer, St. Louis, Mo.

[73] Assignee: Laborsaber, Inc., St. Louis, Mo.

[21] Appl. No.: 229,630

[22] Filed: Apr. 19, 1994

[51] Int. Cl.⁶ .............................. B26D 7/06; B27B 13/04
[52] U.S. Cl. .................................. 83/439; 83/438; 83/450
[58] Field of Search .................................. 83/439, 410.9,
83/450, 733, 410, 412, 425, 441.1, 708,
438; 33/27.03, 27.031, 18.1, 32.1, 632,
640, 645, 533, 27.033, 27.06

[56] References Cited

U.S. PATENT DOCUMENTS

| | | |
|---|---|---|
| D. 325,588 | 4/1992 | Bohrer . |
| D. 328,751 | 8/1992 | Bohrer . |
| 596,738 | 1/1898 | Castle . |
| 800,257 | 9/1905 | Abetz ..................... 33/27.031 |
| 950,175 | 2/1910 | Hotchkiss ..................... 83/439 |
| 1,031,354 | 7/1912 | Machava ..................... 33/27.031 |
| 1,944,524 | 1/1934 | Parrish . |
| 2,535,673 | 12/1950 | Forbes . |
| 2,696,230 | 12/1954 | Libby . |
| 2,720,897 | 10/1955 | Kairath . |
| 2,801,652 | 8/1957 | Meeker, Sr. ..................... 83/439 X |
| 2,810,960 | 10/1957 | Johnson et al. ..................... 33/18.1 X |
| 2,902,760 | 9/1959 | Koenig ..................... 33/18.1 X |
| 2,989,808 | 6/1961 | Koenig ..................... 33/27.03 |
| 3,392,449 | 7/1968 | Tierney ..................... 33/27.03 |
| 3,995,521 | 12/1976 | Raphael . |
| 4,027,566 | 6/1977 | Harrill . |
| 4,244,253 | 1/1987 | Flanigan . |
| 4,693,155 | 9/1987 | Ledford, Jr. . |
| 5,231,905 | 8/1993 | Trahan . |

FOREIGN PATENT DOCUMENTS 28081  5/1977  Japan ........................................ 33/18.1

Primary Examiner—Rinaldi I. Rada
Assistant Examiner—Clark F. Dexter
Attorney, Agent, or Firm—Kalish & Gilster

[57] ABSTRACT

A circle cutting device for selectively rotatably retaining a workpiece in a jigsaw permits a user of the circle cutting device to cut accurate circles with the jigsaw. The circle cutting device includes an elongated track secured to the jigsaw, and further includes a housing having an upper portion slidably adjustably attached to the elongated track for location at a preselected position and a lower portion with a centrally located opening therein. A pin is positioned in the centrally located opening of the lower portion of the housing and extends a predetermined distance from the opening for selectively engaging a workpiece and maintaining the workpiece in a preselected position in relation to the jigsaw, thereby providing a pivot point for rotatably retaining the workpiece in the jigsaw so as to permit the user of the jigsaw to accurately cut circles from the workpiece. A spring is located within the housing between the upper shoulder portion of the housing and the thumbscrew, biasing the pin downwardly onto the workpiece and a pin is located in the lower portion of the housing for securing the pin within the housing at a predetermined distance.

17 Claims, 2 Drawing Sheets

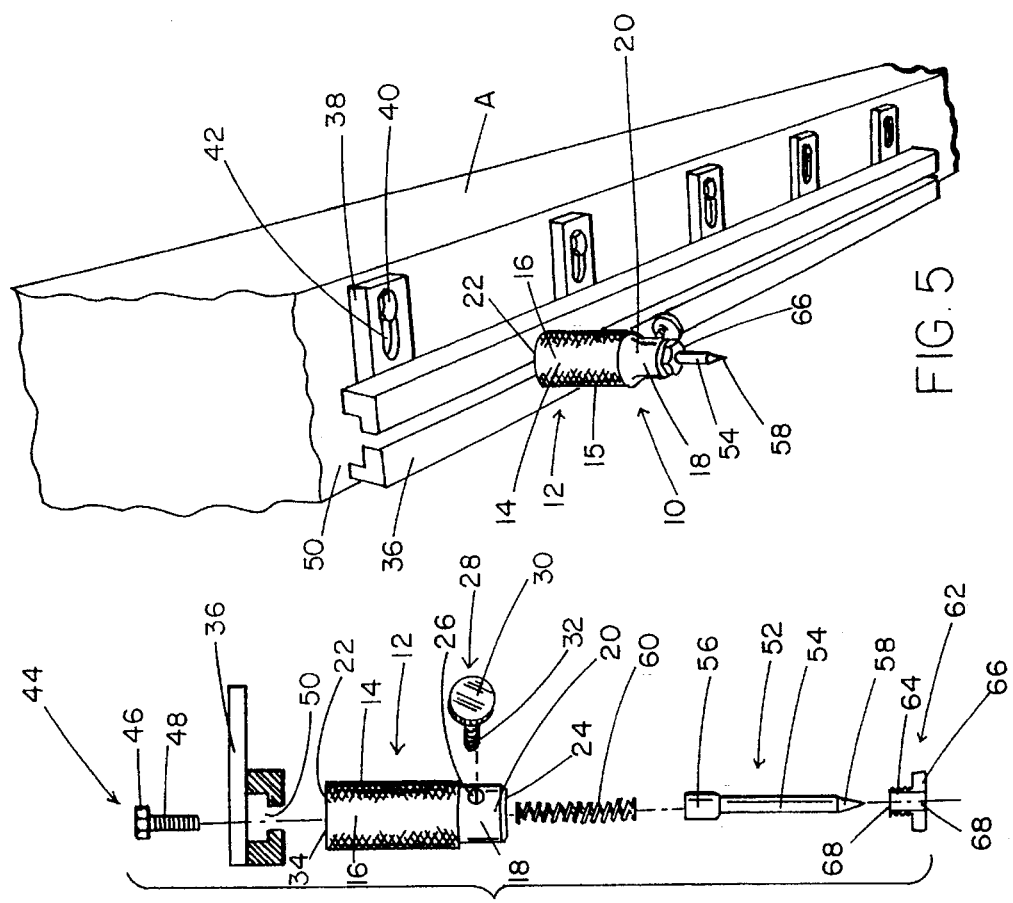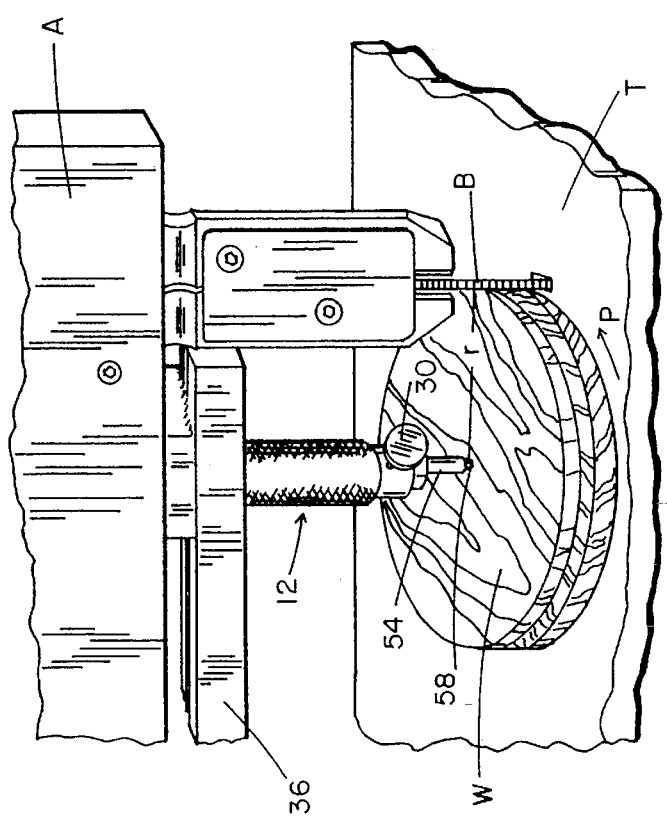

CIRCLE CUTTING DEVICE

BACKGROUND OF THE INVENTION

The present invention relates to saws, and more particularly to a circle cutting device that readily attaches to a saw armor another easily accessible portion of a saw for guiding a workpiece into a moving saw blade thereby cutting accurate circles.

Circle cutting devices commonly used in such industries as for example wood-working, pattern making and furniture manufacture, typically attach to a sawing apparatus and direct a workpiece into a saw blade so as to precisely cut circles or partial arcs from the workpiece. More specifically, the devices of the prior art provide a stable pivot point for the workpiece to rotate about, enabling the blade to cut a well-proportioned circle. In addition, the circle cutting devices provide for repeatability and accuracy in cutting when cutting a series of several circles identical in size. The user adjusts the device to a position on the workpiece that corresponds to the radius of the diameter of the circle to be cut. The devices used in the aforementioned industries are typically adapted for band saws and table saws. For example, U.S. Pat. No. 3,995,521, issued to Raphael on Dec. 7, 1976, discloses an apparatus for cutting circles with band saws. This type of saw uses a blade consisting of a circle that is threaded through an upper housing and below a flat table or working surface. The blade is thus a continuous vertically oriented band that rotates through the upper housing and the work support table. Raphael teaches a cutting device including a base that extends outwardly from the band saw table. A vertically threaded bolt is threaded through a block which attaches to a support arm of the base. The block is moved along the support arm into the desired position and the bolt is rotated until the end of the bolt engages a workpiece placed on the saw table. Other circle cutting devices found in the prior art are appropriate for attachment to table saws. This type of saw uses a circular toothed blade having a diameter ranging from approximately six to seven inches. The blade is mounted below the table surface and vertically projects through a slot in the table. In one example, U.S. Pat. No. 5,231,905, issued to Trahan on Aug. 3, 1993, discloses an accessory that attaches to the table portion of a saw. The accessory has a planar frame with a protruding member that engages an existing slot in the saw table. A stationary pivot pin attached to an adjustable arm secures to the planar frame. The arm is moved until the pivot pin is in the desired position and then a set screw tightens the arm-pin assembly into place. The workpiece is then placed on the pin and secured to the table with clamps providing stable alignment for circle cutting. Still other devices known in the prior art for use with various cutting apparatus secure beneath the saw table, or to an extension extending from the table. For example, U.S. Pat. No. 4,693,155 issued to Ledford on Sep. 15, 1987, discloses a saw attachment that secures beneath the saw table. A frame with a movable carriage having a centering pin is mounted directly beneath the work table of the saw. An actuating device moves the carriage into position along a threaded rod parallel to the workpiece. The position of the carriage corresponds to the desired diameter of the circle to be cut. The diameter is defined by an adjusting stop located on the threaded rod. Although the devices of the prior art serve the intended purpose of providing a pivot point for guiding a workpiece into a saw blade so as to accurately cut a circle or the like, their use is limited to band saws, table saws, or other cutting apparatus having accessible table space for affixing the device either below the table or directly on to the upper surface of the table. Furthermore, most of the cutting devices known in the prior art include pivot pins and other combination of parts which result in a complex assembly requiring excess set up time to properly align on a workpiece before sawing to insure accurate cutting.

There exists a need for a circle cutting device that is easily adjustable with minimum set up time and readily accessible during the cutting process. In addition, there exists a need for a circle cutting device that can be used with a jigsaw and more particularly suited for a jigsaw as disclosed in U.S. Pat. No. Des. 325,588 issued to A. S. Bohrer on Apr. 21, 1992, and Des. No. 328,751 issued to S. P. Bohrer on Aug. 18, 1992. These saws are characterized by a horizontal arm extending across the table portion of the saw. As contrasted with band saws and table saws, jigsaws typically use a relatively short, narrow blade approximately 6 to 10 inches in length. The saws illustrated in the two Bohrer patents are well known in the steel rule die industry as retractable jigsaws that are characterized by having vertically reciprocating saw blades wherein the blade is generally connected only at one point above the table top and not connected below the table top. Thus, the saw blade can retract above the table top when the saw is not operating.

SUMMARY OF THE INVENTION

It is therefore an object of this invention to provide a circle cutting device that is simple to adjust during the cutting process.

Still another object of this invention is to provide a circle cutting device that aligns with a workpiece quickly and easily.

Another object of this invention is to provide a circle cutting device that is cost-effective.

Yet another object of this invention is to provide a circle cutting device that is easy to manufacture.

Another object of this invention is to provide a circle cutting device that does not require additional storage space.

A further object of this invention is to provide a circle cutting device that can be used with jigsaws.

A still further object of this invention is to provide a circle cutting device that can be attached to the arm of a retractable jigsaw.

In accordance with this invention, generally stated, a circle cutting device for guiding an apparatus in cutting accurate circles, comprising positioning means having a horizontally extending groove, the positioning means adapted for securing to a surface of a cutting apparatus, a housing having a shoulder portion adapted for passing through the horizontally extending groove for location at a preselected position and a lower portion having an opening therein, a pin positioned in the opening for maintaining a preselected position on a workpiece thereby providing a pivot point which guides the workpiece into the cutting apparatus so as to accurately cut circles from the workpiece, biasing means interposed between the housing shoulder portion and the pin wherein the biasing means biases the pin downwardly onto the workpiece, and pin adjustment means for vertically adjusting the pin within the housing.

BRIEF DESCRIPTION OF THE DRAWINGS

FIG. 3 is a perspective view of FIG. 2 showing the circle cutting device in use with a workpiece;

FIG. 4 is an exploded view of a circle cutting device; and

FIG. 5 is a perspective view of a circle cutting device connected to an elongated track.

DESCRIPTION OF THE PREFERRED EMBODIMENT

Figure 2:
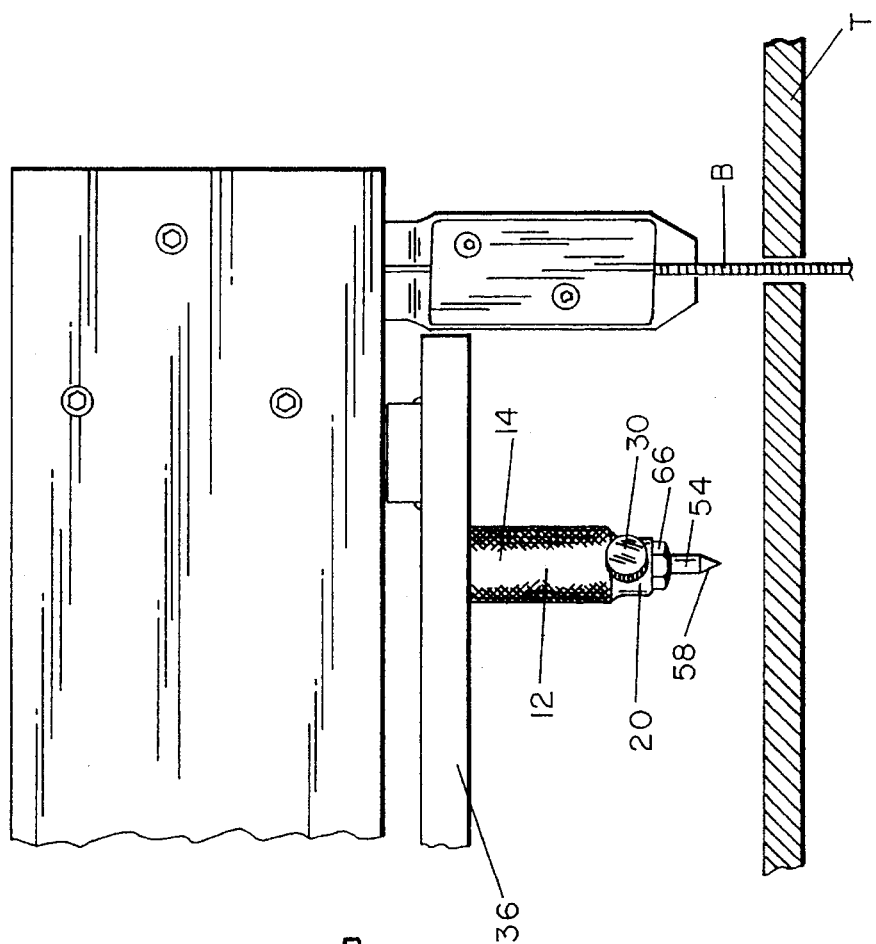
FIG. 2 is a side elevational view of a circle cutting device of FIG. 1.

Referring now to the drawings for one illustrative embodiment of a circle cutting device for use with a saw arm, reference numeral 10 indicates a completed assembly which embodies the invention described herein.

Figure 1:
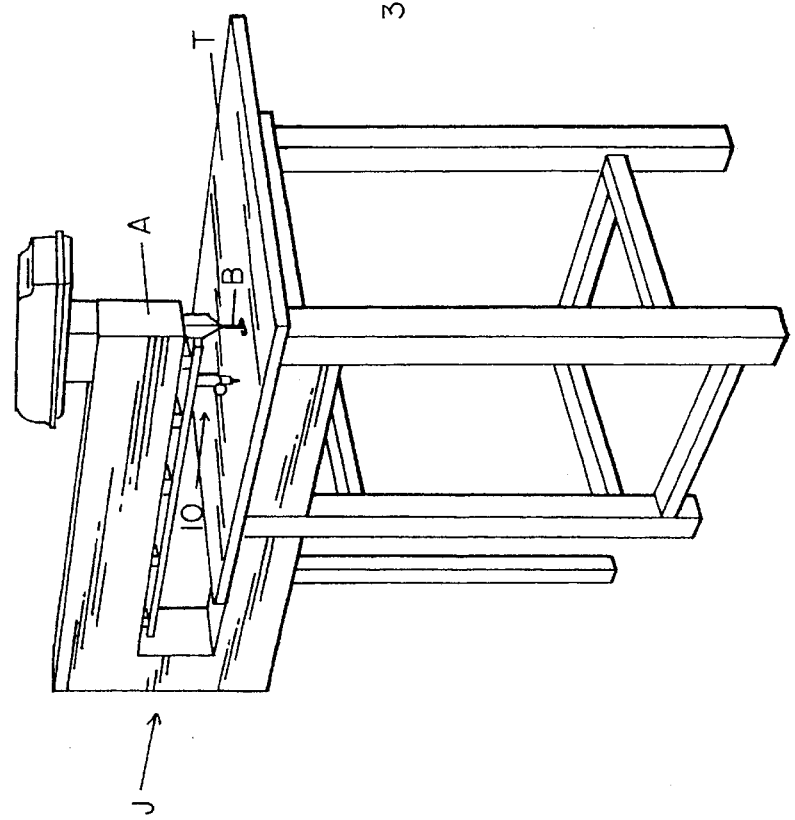
FIG. 1 is a perspective view of a circle cutting device mounted to the lower surface of the arm of a jigsaw.

In the embodiment shown in FIG. 1, the circle cutting device 10 attaches to the lower surface of arm A of a jigsaw J of the type shown and described in U.S. Pat. No. Des. 325,588 to A. S. Bohrer. As shown in FIGS. 4 and 5, device 10 has a cylindrical housing 12 comprising upper barrel portion 14 having a knurled exterior surface 15, first cylindrical upper surface 16, and second cylindrical lower surface 18, which contain lower barrel portion 20. Upper barrel portion 14 is provided with an internal centrally located threaded bore 22 and lower barrel portion 20 contains a centrally located bore 24. An internally threaded shaft bore 26 located immediately adjacent upper barrel portion 14 on lower barrel portion 20 is adapted to receive pin adjustment means 28 as hereinafter more fully discussed.

Cylindrical housing 12 is further provided with a shoulder portion 34 which extends inwardly from first cylindrical upper surface 16 and defines the top surface of housing 12. Shoulder portion 34 is adapted for slidably engaging (adjustably attaching to) an elongated track member 36.

Elongated track member 36 includes a horizontally extending groove 50 which extends centrally in a longitudinal direction along the length of the track. Elongated track member 36 is further provided with a series of slotted brackets 38 extending outwardly from the track opposite horizontally extending groove 50. Slots 42 provide apertures in slotted brackets 38 for receiving a plurality of fasteners 40. Brackets 38 secure elongated track member 36 to a surface of the cutting apparatus. In the preferred embodiment shown in FIGS. 1–3 and 5, brackets 38 secure the circle cutting device 10 to the lower surface of horizontal arm A of jigsaw J as disclosed in my U.S. Pat. No. Des. 328,751 as by a plurality of fasteners 40 which project through slots 42 and connect to arm A in any conventional manner.

The circle cutting device 10 has a locator pin 52 that is vertically positioned in centrally located bore 24 of lower barrel portion 20 which comprises cylindrical rod 54, upper cylindrical head portion 56 defining one end and a downwardly directed tapered end 58. Head 56 extends outwardly concentrically from cylindrical rod 54 and has a diameter sized larger than the diameter of cylindrical rod 54. At the end opposite head 56, cylindrical rod 54 tapers to tapered end 58. Locator pin 52 provides a stable pivot point for circle cutting device 10. In a further embodiment, locator pin 52 is interchangeable with locator pins of a variety of lengths to compensate various thicknesses of workpieces.

As shown in FIG. 4, biasing means 60 comprises metal helical spring that is located in central bore 24 and interposed between a lower surface of shoulder portion 34 and cylindrical head portion 56 of locator pin 52. Spring means 60 abuts adjacently on head 56 and biases tapered end 58 of locator pin 52 downwardly in proximity with a workpiece W placed on saw table T.

Pin adjustment means 28 as shown in FIG. 4 consists of circular head portion 30 and externally threaded shaft portion 32 which is adapted to be threaded substantially transversely into internally threaded shaft bore 26. When completely threaded into housing 12, shaft end 32 engages pin 52, thereby holding pin 52 stationary in a vertical position within housing 12. In this embodiment, pin adjustment means 28 may be unthreaded so that threaded shaft portion 32 threadably disengages from the interior of housing 12 of internally threaded shaft bore 26 releasing locator pin 52. When locator pin 52 is released, spring means 60 biasing pin 52 downwardly onto workpiece W. As shown in FIG. 3, tapered end 58 of locator pin 52 penetrates into workpiece W and maintains a preselected position on the workpiece as a pivot point.

In a further embodiment, circle cutting device 10 may include a T-shaped member 62 having a hexagonal shaped head portion 66 and a threaded stem portion 64. A centrally located bore 68 extends axially through the entire length of T-shaped member 62. The diameter of centrally located bore 68 corresponds to the diameter of the cylindrical rod 54 and is smaller than the diameter of head 56. Centrally located bore 68 is sized for slidably receiving cylindrical rod 54 and for retaining head 56 in housing 12. Stem portion 64 is threaded into centrally located bore 24 of lower barrel portion 20. The larger diameter of head 56 prevents locator pin 52 from disengaging from T-shaped member 62 thereby allowing locator pin 52 to be biased downwardly against workpiece W without separating from housing 12.

In operation, shoulder portion 34 is slidably attached to elongated track member 36 for positioning housing 12 in a predetermined location. FIG. 4 illustrates one embodiment of a method for securing cylindrical housing 12 to elongated track 36. In particular, a track stud 44 comprising a cap 46 and a threaded cylindrical portion 48 is threaded into internally threaded bore 22 of upper barrel portion 14 of housing 12. Cap 46 has a diameter sized larger than the width of a horizontally extending groove 50 of elongated track member 36. Track stud 44 slidably engages elongated track 36 with flat cap 46 resting on the horizontally extending groove 50 of elongated track member 36. Threaded cylindrical portion 48 extends through horizontally extending groove 50 and engages threaded bore 22 of upper barrel portion 14 thus securing housing 12 to elongated track member 36.

As shown in FIG. 3, housing 12 slides longitudinally along the length of track 36 to a preselected position corresponding to a radius "r" of the diameter of the circle size desired to be cut thereby producing a finished circle having a prescribed diameter. The preselected position is determined by moving device 10 along elongated track 36 to a position "r" corresponding to the radius which defines the diameter of the circle to be cut. The circle radius varies as device 10 is moved along track 36. The user may easily adjust the device to different radii on arm A between cutting circles. Securing the device directly to a surface such as arm A of jigsaw J eliminates the need for excess storage space as required with table saw extensions. This allows an operator to move workpiece W along path P into blade B which is moving in a continuous vertical reciprocating manner so as to cut an accurate circle in the workpiece. After finished cutting a complete circle from a workpiece W, locator pin 52 may be manually retracted into housing 12 and secured into position by threading adjustment means 28 into internally threaded shaft bore 26. The finished workpiece may now be removed and another workpiece may be placed on saw table T to be cut with the same radius thereby enabling finished workpieces to be rapidly cut into identical circles.

In view of the foregoing, it will be seen that several objects of the invention are achieved and other advantages are attained.

Although the foregoing includes a description of the best mode contemplated for carrying out the invention, various modifications are contemplated.

As various modifications could be made in the constructions herein described and illustrated without departing from the scope of the invention, it is intended that all material contained in the foregoing description or shown in the accompanying drawings should be interpreted as illustrative rather than limiting.

What is claimed is:

1. A circle cutting device on a jigsaw for selectively rotatably retaining a workpiece in the jigsaw so as to permit a user of the circle cutting device to cut accurate circles with the jigsaw, the circle cutting device comprising:

circle radius positioning means secured to the jigsaw;

a housing having an upper portion slidably adjustably attached to the circle radius positioning means for location at a preselected position, and a lower portion with a centrally located opening therein;

a pin positioned in the centrally located opening of the lower portion of the housing and extending a predetermined distance from said opening for selectively engaging a workpiece and maintaining the workpiece in a preselected position in relation to a blade of the jigsaw, thereby providing a pivot point for rotatably retaining the workpiece in the jigsaw so as to permit the user of the jigsaw to accurately cut circles from the workpiece;

biasing means, located within the housing, for biasing the pin downwardly onto the workpiece; and pin adjustment means, located in the lower portion of the housing, for securing the pin within the housing at said predetermined distance.

2. The circle cutting device of claim 1, wherein the circle radius positioning means further comprises an elongated rigid piece having a longitudinal groove therein.

3. The circle cutting device of claim 1, wherein the circle radius positioning means is an elongated track secured to a horizontal arm of the jigsaw, which arm extends over a table of the jigsaw, the elongated track having a longitudinal groove therein.

4. The circle cutting device of claim 3, wherein the elongated track further comprises a plurality of brackets which are used in securing said elongated track to said horizontal arm.

5. The circle cutting device of claim 1, wherein the housing further comprises at said upper portion thereof, an internally threaded bore which extends longitudinally into said housing, and means for slidable adjustable attachment to the circle radius positioning means threadably received at the upper portion of the housing, by the internally threaded bore.

6. The circle cutting device of claim 5, wherein the circle radius positioning means further comprises a longitudinal groove, and further wherein the means for slidable adjustable attachment to the circle radius positioning means has an externally threaded shaft which passes vertically downwardly through the longitudinal groove and engages the internally threaded bore of the housing, and has a flat head portion that slidably abuts an upper surface of the circle radius positioning means.

7. The circle cutting device of claim 1, wherein the lower portion centrally located opening is a bore which extends a predetermined distance upwardly into said housing and receives the pin.

8. The circle cutting device of claim 1, wherein the housing further comprises a wall portion having an internally threaded bore which extends through said wall portion and receives said pin adjustment means.

9. The circle cutting device of claim 1, wherein the pin further comprises a head portion and a cylindrical rod portion.

10. The circle cutting device of claim 9, wherein the head portion extends radially outwardly and concentrically from the cylindrical rod portion.

11. The circle cutting device of claim 9, wherein the cylindrical rod portion further comprises a tapered end tapered radially inwardly and located opposite the head portion.

12. The circle cutting device of claim 1, wherein the biasing means comprises a compression spring.

13. The circle cutting device of claim 1, wherein the pin adjustment means further comprises a thumbscrew having a threaded shaft transversely penetrating the lower portion of the housing, the threaded shaft having a first end and a second end, wherein the first end of the threaded shaft contacts the pin and the second end of the threaded shaft extends outwardly and has a head portion, to thereby permit the user to secure or release the pin in relation to the housing.

14. The circle cutting device of claim 1, further comprising locking means for retaining the pin within the housing.

15. A circle cutting device on a jigsaw for guiding a workpiece into a saw blade of the jigsaw so as to cut accurate circles, the circle cutting device comprising:

circle radius positioning means comprising an elongated track having a horizontally extending groove which extends longitudinally the length of said elongated track and a plurality of brackets extending from said elongated track and being secured to the jigsaw;

a housing having an upper portion and a lower portion, the upper portion having an internally threaded bore receiving a lower end of a threaded fastener, the threaded fastener having an enlarged upper end which slidably adjustably engages the horizontally extending groove of the elongated track, to thereby permit selective location at a predetermined position, the housing further having a centrally located longitudinal bore extending a predetermined distance upwardly from a lower end of the housing into said housing for receiving a pin, and a wall portion having an internally threaded transverse bore which extends through said wall portion;

a pin held vertically in the centrally located longitudinal bore of the lower portion of the housing, the pin having a cylindrical rod portion, a head portion at one end extending radially outwardly from said cylindrical rod portion, and a tapered end located opposite said head portion, whereby said pin maintains a preselected position on the workpiece thereby providing a pivot point for guiding the workpiece into the blade of the jigsaw, so as to permit the user of the jigsaw to accurately cut circles from the workpiece;

a compression spring located longitudinally within the longitudinal bore of the housing and biasing the pin downwardly onto the workpiece;

a thumbscrew having a threaded shaft portion threaded into the threaded transverse bore in releasable contact with the pin to thereby releasably fix the pin within the housing.

16. In combination with a saw comprising a horizontal arm extending over a saw table, a circle cutting device for use with said horizontal saw arm, the device comprising:

an elongated track having a horizontal groove which extends longitudinally the length of said elongated track and a plurality of brackets extending from said elongated track, wherein said plurality of brackets are secured to said horizontal arm extending over the saw table;

a housing having an upper portion with an internally threaded bore receiving a lower end of a threaded fastener, wherein the threaded fastener passes through the horizontal groove for locating the housing at a predetermined position along the elongated track to thereby set the radius of the circle to be cut, the housing also having a lower portion having a centrally located longitudinal bore extending a predetermined distance upwardly into said housing, and a wall portion having an internally threaded transverse bore which extends through said wall portion;

a pin positioned in the centrally located longitudinal bore and comprising a cylindrical rod portion, a head portion at one end extending radially outwardly from said cylindrical rod portion, and a tapered end located opposite said head portion, whereby said pin maintains a preselected position on a workpiece thereby providing a pivot point for guiding the workpiece into a saw blade of the saw so as to accurately cut circles from the workpiece;

a compression spring located within the housing and biasing the pin downwardly onto the workpiece; and a pin adjustment member comprising a thumbscrew having a shaft portion threadably received in the internally threaded transverse bore in the housing, the pin adjustment member releasably contacting the pin within the housing.

17. The combination of claim 16, and further comprising a T-shaped member removably engaged with the lower end of the housing to thereby retain the pin within the housing.

* * * * *